UNITED STATES PATENT OFFICE.

CLARK M. DENNIS, OF PHILADELPHIA, PENNSYLVANIA, ASSIGNOR TO THE BARRETT COMPANY, A CORPORATION OF NEW JERSEY.

CLEANSING MATERIAL.

1,365,464.　　　　　　　Specification of Letters Patent.　　Patented Jan. 11, 1921.

No Drawing.　　　Application filed June 21, 1918.　Serial No. 241,277.

*To all whom it may concern:*

Be it known that I, CLARK M. DENNIS, a citizen of the United States, residing at Philadelphia, in the county of Philadelphia and State of Pennsylvania, have invented certain new and useful Improvements in Cleansing Materials, of which the following is a specification.

My invention relates to cleansing materials and liquid soaps in which one of the constituents is a high boiling synthetic oil consisting chiefly of addition products and polymerization products of cumarone, indene, and other constituents of coal tar naphthas.

This oil is obtained in an impure condition as a by-product in the manufacture of paracumarone, and consists of polymerization products and addition products of cumarone, indene styrene and similar products found in the naphthas obtained from the distillation of coal tar or from benzol and toluol manufacture. Subjecting these naphthas to suitable polymerization yields nonvolatile paracumarone together with a varying proportion of slightly volatile heavy oil, and unchanged naphthas. This oil may have a boiling point as high as 320° C., or higher, at 760 mm. pressure. After distillation of the naphthas the heavy oil may be separated from the paracumarone, in any suitable manner, such as by steam distillation, and may then be dried by the use of the centrifuge, or other suitable means. The oil so obtained may contain some naphtha, naphthalene, sulfur compounds and other impurities, and may be subjected to further purification by the usual chemical and distillation processes as desired. I have found that this oil, although it is largely unsaponifiable, possesses unusual penetrating, emulsifying and solvent properties, and is a very good cleansing agent of special value in the removal of many greases, gums, etc., which are not soluble in water, and which are not removed by ordinary soaps.

In practising this invention, I may prepare a liquid cleanser from this oil by emulsifying it in water with nearly any variety of soap and find that I can get permanent emulsion although varying the proportions of oil, water, and soap within wide limits. For example, I may use equal portions of oil, water and ordinary soap with very satisfactory results. This emulsion serves as a liquid cleansing agent which can be used with or without further addition of water for many cleansing purposes. It is especially useful as a mechanic's hand soap since the presence of the oil gives much better penetrating and degreasing properties than are obtained from the soap alone.

An excess of free alkali is not necessary to obtain emulsion with this oil, and it can therefore be applied, although it is less convenient, by mixing it with a soap solution at the time of use. Even when used in this way its cleansing and solvent properties are utilized in a very effective manner.

By varying the constituents added to the oil and by the addition of special materials, such as a disinfectant, the mixtures may be adapted to a wide variety of uses, such as cleansing, polishing, preserving, preventing rust, lubricating, disinfecting, etc.

Claims:

1. As a new composition of matter, a cleansing material comprising as one of its constituents oil which is a slightly volatile polymerization product of coal tar naphtha.

2. As a new composition of matter, a cleansing material comprising as one of its constituents oil which boils at a high temperature, said oil being slightly volatile polymerization products of coal tar naphthas.

3. As a new composition of matter, a cleansing material comprising as one of its constituents oil which boils at a high temperature, said oil being slightly volatile addition products and polymerization products of coal tar naphthas.

4. As a new composition of matter, a cleansing material containing as one of its constituents oil which is obtained by polymerizing various bodies found in coal tar naphthas with acid.

5. As a new composition of matter, a cleansing material comprising as one of its constituents an oil which boils at a high temperature, said oil being slightly volatile addition products and polymerization products of coumarone, indene, and other bodies found in coal tar napthas.

6. The herein described product which contains soap, water and an oil having a high temperature boiling point, said oil containing a polymerization product of coal tar naphthas.

7. The herein described product which contains soap, water, and an oil obtained from naphtha, which oil boils at about 300° C.

8. The herein described product which contains soap, water, and an oil obtained from naphtha, which oil boils at about 300° C., and a disinfectant.

9. The herein described product which contains soap, water, an oil, and a disinfectant, said oil being polymerization products of bodies found in coal tar naphthas.

In testimony whereof I affix my signature.

CLARK M. DENNIS.